June 18, 1940.  C. LE BLEU  2,204,684
TANDEM DISK EARTH-WORKING IMPLEMENT
Filed Jan. 9, 1939  4 Sheets-Sheet 1
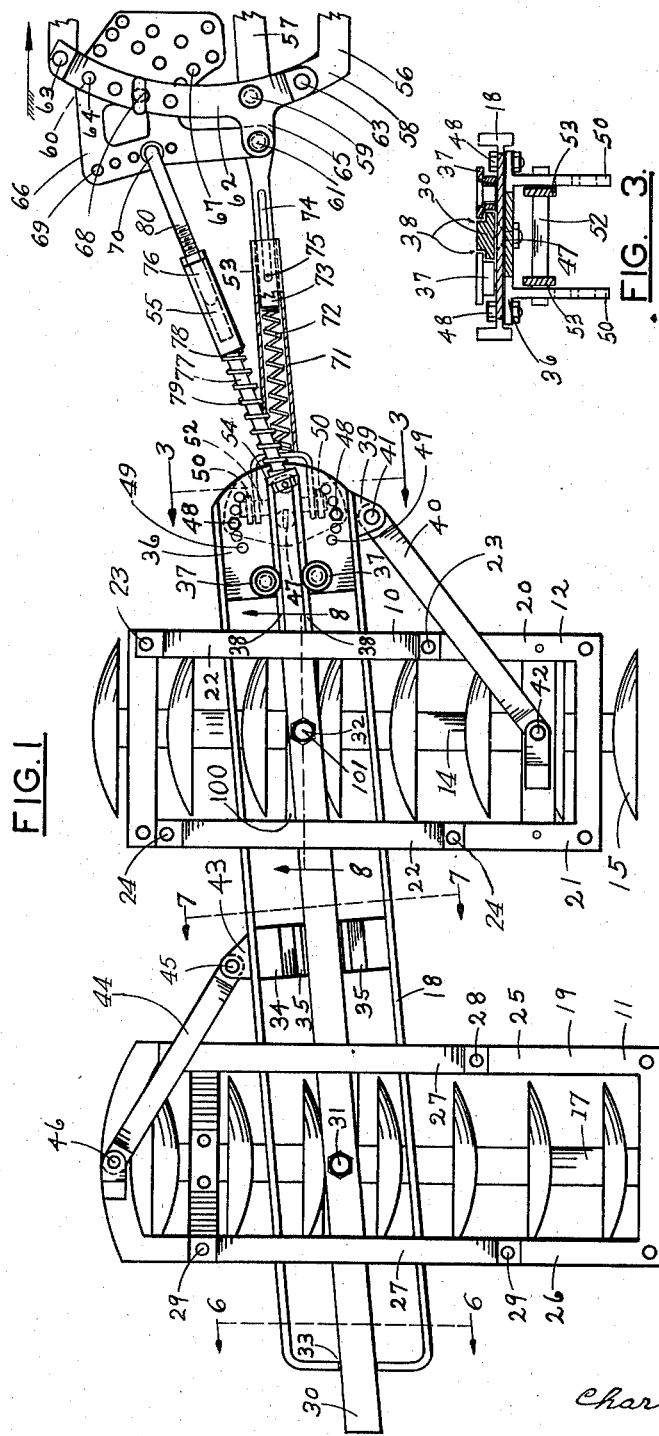
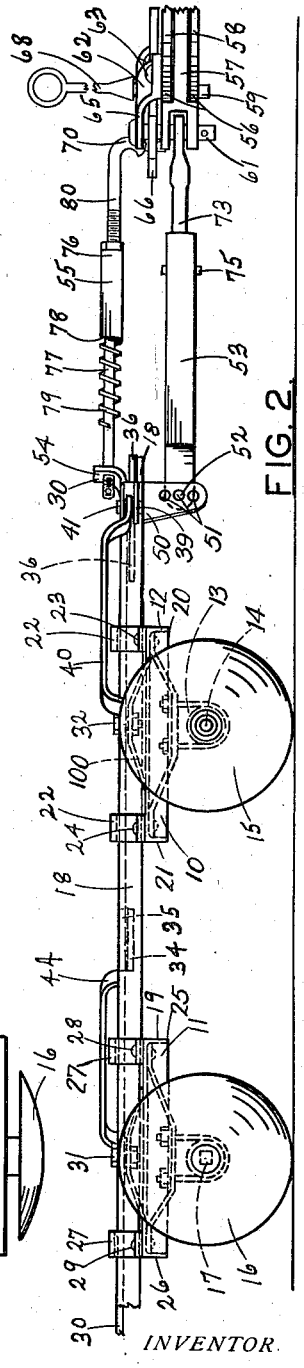
INVENTOR
Charles Le Bleu

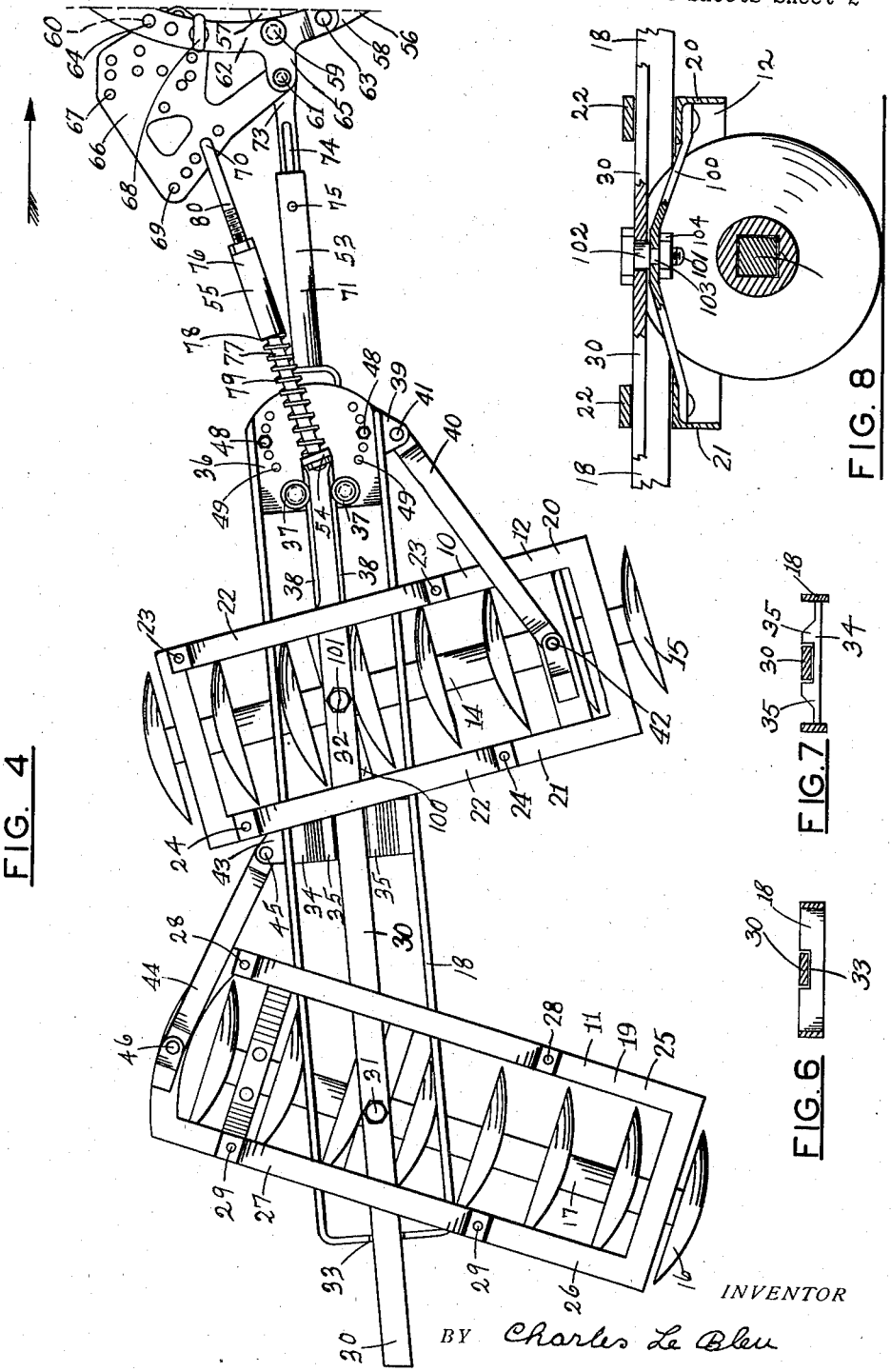

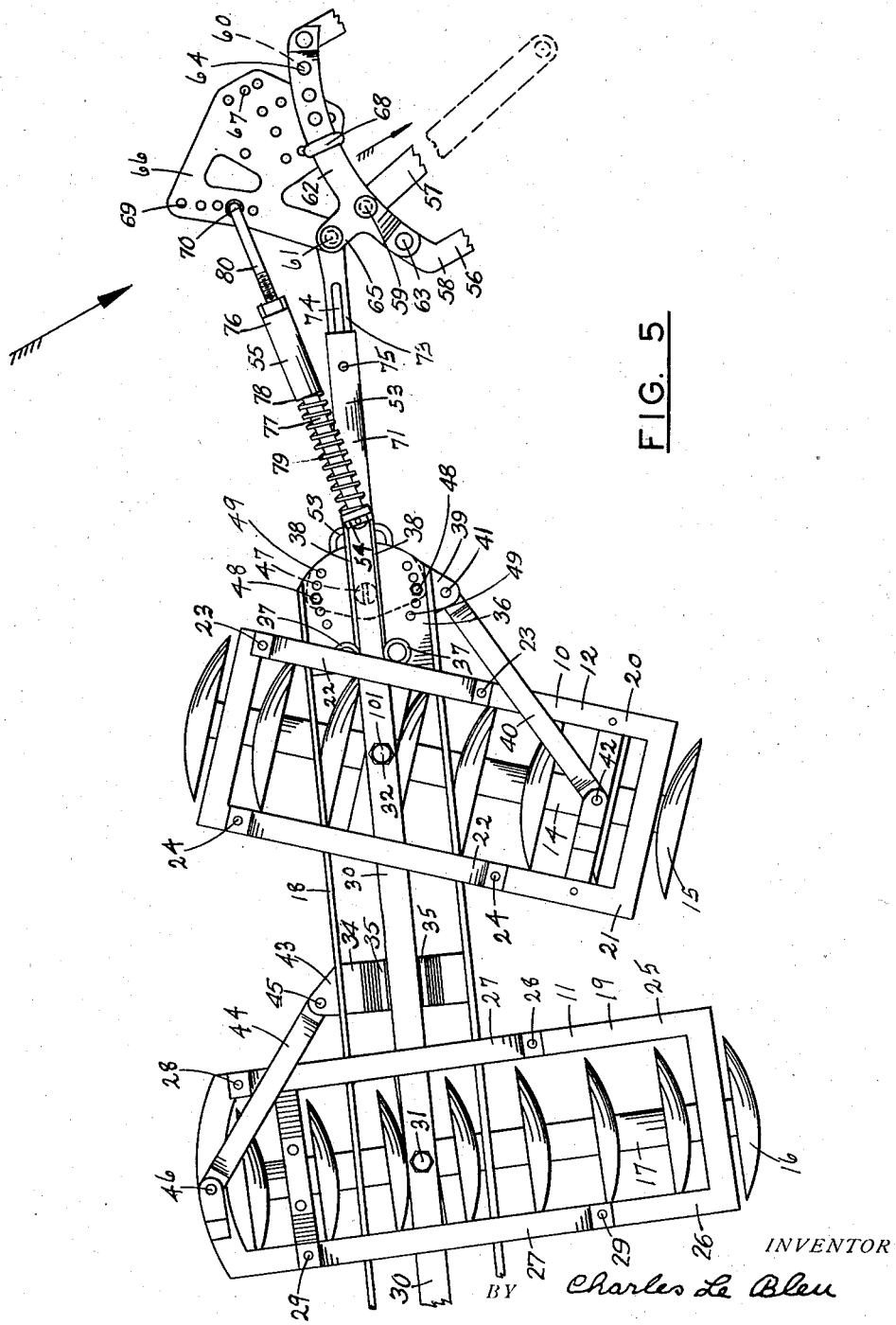

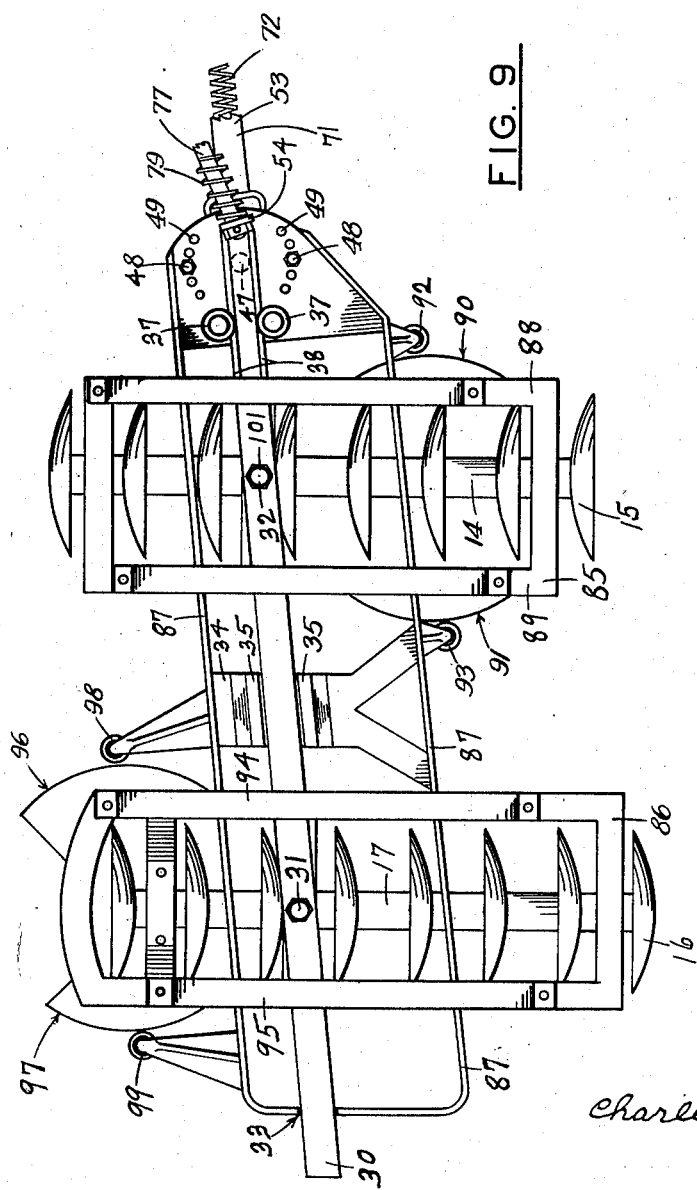

Patented June 18, 1940

2,204,684

UNITED STATES PATENT OFFICE 2,204,684

TANDEM DISK EARTH-WORKING IMPLEMENT

Charles Le Bleu, Los Angeles, Calif.

Application January 9, 1939, Serial No. 249,917

36 Claims. (Cl. 55—83)

My invention relates to tandem disk earth-working implements of which harrows are a typical example, and more specifically, it relates to that class of disk earth-working implements having a front section and a rear section including disk earth-working means, said sections being disposed one behind the other.

In harrows of this type, each of said sections usually comprises a plurality of concavo-convex disks arranged on an axle which is carried by a frame. The sections are operably associated one with the other in such a manner that the sections may be brought into an operative position in which the sections are disposed at an angle to the direction of travel.

An ideal implement of this type should include the following characteristics: First, it should have what we shall call an idle position in which the sections may be moved forwardly with rolling movement of the disks without disking the soil so that the implement may be transported from one place to another such as in going from one field to another, along roads, and to and from the field and the barn; second, the sections should be operably associated so that they may assume a position of angularity with respect to the line of travel for disking the soil and a position of reverse angularity for making a turn; third, the means operably associating the sections should be such that clockwise movement of either section will impart a similar movement to the other section but in a counterclockwise direction; fourth, there should be means to positively cause said sections to assume the above positions, and this means should act positively and automatically in both directions in response to the turning movement of a pulling device, such as a tractor, so that the sections are positively moved to and retained in the desired position irrespective of soil or other conditions which might otherwise cause said sections to close up on the puller or assume some other undesirable position; fifth, the implement should be adjustable so that it may be disposed in idle or disking position either directly behind a puller, such as a tractor, or in offset position relative thereto; sixth, the sections should always be in the same plane; seventh, the implement should be free of upwardly projecting mechanism such as latches and levers that may catch in the lower branches of trees.

It is therefore an object of this invention to provide an implement of the character described embodying, among others, the above characteristics.

Still other objects, features and advantages of my invention will be apparent to those skilled in the art upon detailed perusal of the attached drawings and the following specifications, wherein I exemplify and describe my invention, but it is understood that my invention as herein exemplified and described is susceptible to modification in the combination, correlation and construction of parts, members and features without departing from the spirit of the invention as defined in the annexed claims.

In the drawings—

Figure 1 is a top plan view of my invention with the sections disposed in idle, or non-operating position.

Figure 2 is a side elevation of Figure 1 with all parts in the idle, or non-operating position.

Figure 3 is an enlarged sectional view in elevation, of the primary and secondary control frames taken on broken lines 3—3 of Figure 1.

Figure 4 is a top plan view of my invention with the sections disposed in angular relationship, that is, in disking or operating position and the arrow indicates the direction of travel.

Figure 5 is a top plan view of my invention showing the sections in reverse angled position for making a turn in a direction around the normally open ends of the sections.

Figure 6 is a sectional view in elevation of the primary and secondary control frames taken on broken line 6—6 of Figure 1.

Figure 7 is a sectional view in elevation of the primary and secondary control frames taken on broken line 7—7 of Figure 1.

Figure 8 is a sectional view in elevation of the front section taken on broken line 8—8 of Figure 1.

Figure 9 is a top elevation of a modified form of my invention with the sections disposed in parallel, that is, idle position.

Referring now to the drawings, it will be seen that there is a front section 10 and rear section 11 disposed behind front section 10, said sections being of any suitable construction. Front section 10 comprises a rectangular frame 12 carrying a plurality of journal boxes 13 spaced longitudinally thereof and in which is journaled an axle 14 which axle is provided with disks 15 of any conventional type. Disks 15 are here shown as being concave toward the right because this is common practice. The rear section 11 is constructed similar to front section 10 with the exception that the disks 16 carried by frame 11 are disposed on axle 17 with their concaved sides facing oppositely to those of the front section. However, the general construction of rectangular frames 10 and 11, disks 15 and 16 and the manner in which the disks are mounted is conventional and well known in the art and further details of this construction would contribute nothing to the understanding of my invention since they may be of any type desired.

A primary control frame 18 is of rectangular construction and is slidably disposed across the front and rear sections 10 and 11, as shown, and rests upon rectangular frames 12 and 19. The front and rear rails 20 and 21 of rectangular frame 12 are each provided with an inverted U bracket 22 disposed above the primary control frame 18 and in sliding contact therewith, said U brackets being secured to said front and rear rails 20 and 21 as indicated at 23 and 24. The front and rear rails 25 and 26 of rectangular frame 19 are each provided with an inverted U bracket 27 disposed above the primary control frame 18 and in sliding contact therewith, said U brackets being secured to said front and rear rails 25 and 26 as indicated at 28 and 29. Thus, it is seen that primary control frame 18 is slidably associated with the front and rear sections 10 and 11 and confined therewith in such a manner that said sections will always be in the same plane.

A secondary control frame 30 is disposed transversely across the longitudinal extensions of sections 10 and 11 and its pivotally secured to said front and rear sections 10 and 11 in the manner exemplified in Figure 8, in which rectangular frame 12 is provided with a bar 100 extending transversely of the longitudinal extension of frame 12 and between the ends thereof, and is rigidly secured at its ends to rails 20 and 21 as shown, and is provided with an opening. A bolt 101 is formed with a large diameter section 102 which passes through secondary control frame 30, and a small diameter section 103, which extends on downwardly through bar 100 and is provided at its threaded end with a nut 104. It will readily be seen that when the nut 104 is tight, the shoulder, or seat, formed at the junction of large diameter 102 and small diameter 103, will be drawn hard into contact with the top surface of bar 100, and thus bolt 101 becomes rigid with bar 100, and secondary control frame 30 is pivotally mounted on large diameter 102.

A description of the manner in which secondary control frame 30 is pivotally secured to the rear section 11 at 31, would simply be a repetition of the description just concluded relative to the pivotal connection of frame 30 with front section 10, since they are mounted in identically the same manner.

Primary and secondary control frames 18 and 30 respectively are slidably associated as follows; the rear end of primary frame 18 is notched as shown in Figure 6 at 33 to slidably confine secondary control frame 30. Between the front and rear sections the primary control frame 18 is provided with a cross bar 34 disposed beneath secondary control frame 30, see Figure 7. Cross bar 34 is provided with a pair of upwardly extending blocks 35 disposed one at each side of secondary control frame 30 and in sliding contact therewith. Forwardly of front section 10 the primary control frame 18 is provided with a plate 36 disposed beneath secondary control frame 30 and upon which secondary control frame 30 rests, see Figure 3. Plate 36 is provided with a pair of rollers 37 disposed to turn on a vertical axis carried by plate 36, said rollers being disposed one at each side of secondary control frame 30 and having rolling association therewith. Attention is directed to the fact that rollers 37 are each formed with two diameters, and that rollers 37 are disposed on their vertical pivots with the larger diameter uppermost, see Figure 3. It will also be noted that the forward end of secondary control frame 30 is provided at each of its edges with grooves 38 into which the larger diameter of the rollers 37 extend. Thus, since secondary control frame 30 rests on plate 36, and the rollers 37 are carried by plate 36 and are provided with a larger diameter portion which extends into grooves 38, the primary control frame 18 and the secondary control frame 30 are confined one with the other both laterally and vertically. Thus, said primary control frame 18 and secondary control frame 30 are slidably associated one with the other.

Primary control frame 18 is provided adjacent its forward end with a bracket 39 to which the forward end of link 40 is pivotally secured by a pin 41, the opposite end of link 40 being pivotally secured to the front section 10 as shown at 42. Primary control frame 18 is also provided with a bracket 43 to which the forward end of a link 44 is pivotally secured by a pin 45, the rear end of link 44 being pivotally secured to the rear section 11 as shown at 46. Thus, we see that the primary and secondary control frames are slidably associated one with the other, and each of them is operably associated with each of said sections so that turning movement of either of said sections will impart a similar turning movement to the other section but in an opposite direction. This is important because the sections should work the soil to substantially the same degree, but the amount of work done by a section is determined by the angularity of the section relative to the line of travel and therefor equal work will be done by the sections only if both sections are disposed at the same angularity to the line of travel, and so it follows that the sections should be associated so that the angularity assumed by either of said sections will be imparted to the other, and this I accomplish in the embodiment of my invention illustrated in the accompanying drawings.

By consulting Figures 4 and 5 it will be noted that the manner in which I have operably associated the front and rear section enables them to assume the position of Figure 5 from that of Figure 4 with the advantage that the implement may easily make a turn toward the normally open ends of the sections, which is next to impossible in an implement lacking in the characteristic of sections capable of relative angular movement in either direction.

The forward end of primary control frame 18, that is to say, plate 36, is provided with a plate 47 disposed beneath plate 36 and adjustably secured thereto by bolts 48. Plate 36 is also provided with a plurality of openings 49 disposed at each side of bolts 48. Thus it is seen that bolts 48 may be removed and plate 47 may be disposed in any one of a plurality of angular positions relative to the longitudinal extensions of primary control frame 18 and then secured in the selected position by means of bolts 48. Plate 47 is provided with a pair of downwardly extending brackets 50 rigid therewith and having openings 51 carrying a pin 52 upon which is journaled a primary draft means 53 for vertical swinging movement. It should be particularly noted that draft means 53 may not swing laterally relative to the longitudinal extension of primary control frame 18 except upon the removal of bolts 48 for the purpose of adjustment as above described, and these bolts 48 are removed only for purposes of adjusting plate 47 relative to control frame 18 to determine the degree of offset at which the implement will trail behind the pulling device. In other words, if it is desired that the sections 10 and 11 are to operate in offset position relative to the draft device, bolts 48 should be removed and plate 47 together with primary draft means 53 swung laterally in a direction opposite to the desired offset position and again secured in the selected position by means of bolts 48. The implement will then operate in offset position relative to the pulling device to a degree determined by the adjusted position of plate 47.

Secondary control frame 30 is turned up at its forward end to provide a bracket 54 having an opening therethrough. The rear end of a secondary draft means 55 extends through the opening in bracket 54 and is provided at its rear end with a nut somewhat larger than the opening so that a pulling force may be applied to bracket 54 through the medium of secondary draft means 55, and the opening through bracket 54 is larger than that portion of secondary draft means 55 that passes through it so that in fact the rear end of secondary draft means 55 can be said to be articulately connected to bracket 54.

A pulling device is indicated at 56, usually a tractor, and includes the draw bar 57 and vertically spaced arcuate bars 58 to which the draw bar 57 is secured at 59, said pulling device usually being provided with a plurality of openings 60, draw bar 57 also being provided with an opening and a pin 61. An inverted arcuate U bracket 62 is disposed upon the upper side of said bars 58 and secured thereto as shown at 63 and 59, said U bracket 62 being provided with a plurality of openings 64 arranged therein to coincide with the openings 60 in bars 58. U bracket 62 is provided with a rearwardly projecting portion 65 having an opening therethrough at 61 in register with the opening through draw bar 57.

A hitch 66 is provided with an opening at 61 in register with similar openings through rearwardly extending portion 65 and the drawbar 57. A pin 61 extends downwardly through rearwardly extending portion 65, the forward end of primary draft means 53 which is provided with an opening to receive pin 61, and the draw bar 57. Hitch 66 is provided with a multiplicity of openings 67 therethrough some one of which may be brought to register with some one of the openings 60—64 by swinging the hitch laterally about pivot 61, and a pin 68 is provided for securing hitch 66 in the desired adjusted position. Hitch 66 is also provided with a series of openings 69 spaced from the pivot 61 and by means of which the forward end of secondary draft means 55 may be secured as shown at 70 to hitch 66 at a selected distance spaced from pivot 61.

The existence of a primary and secondary draft means has been stated as well as their connection to the implement and the tractor, but there are further characteristics of the two draft means which will now be described.

Primary draft means 53 comprises a tubular section 71 closed at its rear end and open at its front end. A compression spring 72 is disposed within member 71. A member 73 is adapted at its forward end for connection to the pulling device 56 at 61 and extends rearwardly into the forward end of member 71 a substantial distance and in contact with spring 72, and is provided with a slotted opening 74 through which a pin 75, carried by member 71, passes with the result that the length of primary draft means 53 is variable and such variation is resisted by compression spring 72. Secondary draft means 55 comprises a female threaded member 76 provided at its rear end with an extension 77 of smaller diameter than member 76 thus forming a shoulder or seat at 78. The connection of extension 77 with bracket 54 has heretofore been described. A compression spring 79 encircles extension 77 and exerts a force as between bracket 54 and shoulder or seat 78. Female thread member 76 receives a mail threaded member 80 and is pivotally attached at its forward end to hitch 66 at 70 as previously described. Thus, the maximum length of secondary draft means 55 is adjustable and its effective length is variable, said variation being resisted by compression spring 79.

Having described the preferred form of my improved disk earth-working implement, I shall now describe it in use.

Figure 1 shows the implement in idle or non-disking position with sections 10 and 11 in parallel relationship, which position is used when transporting the implement from one place to another without working the soil and in this position right and left turns may be made without the operator manipulating any of the mechanism included in the implement. In other words, he need only operate the tractor, for as we have seen, the primary and secondary control frames are slidably associated one with the other and each of them operably associated with each of said sections so that lateral turning movement of either of them is transmitted to the other of them, but in reverse direction, and a separate draft means is provided for each of said control frames and mounted on the pulling device at points spaced one from the other so that any turning movement of the pulling device effects pivots 61 and 70 in opposite directions and causes sliding movement between the primary and secondary control frames, which sliding movement causes lateral turning movement of the sections in opposite directions, and thus the implement is caused to follow the pulling device around turns either to the right or left, and to automatically return to idle position when the turn is completed. It may happen frequently that the operator will turn the tractor to such a degree that the relative movement thus imparted to the separate draft means would, if transmitted into relative sliding movement of the control frames and consequently into relative turning movement of the sections, exceed the limits of relative angular movement of the sections. This possibility accounts for the presence of variable draft means and resilient means to resist this variation. For example, when the tractor is turned to the right past the limits of section movement, spring 72 will yield when the sections have reached their limits of movement and allow the primary draft means to shorten and thus prevent injury to the implement. When the tractor is turned to the left past the limits of section movement, spring 79 will yield when the sections have reached their limits of movement and thus permit the effective length of the secondary draft means to contract, the smaller diameter section 77 sliding rearwardly through the opening by which it is connected to bracket 54. It will readily be seen that the limits of section movement will be quickly reached when secondary draft means 55 is operating in the opening at 69.

The description of the right and left hand turning movements just completed applies in any of the adjusted positions of the implement, whether the sections are being used in parallel or angular relationship, offset position, or trailing directly behind the tractor, and will not be repeated in the description to follow.

With further reference to primary and secondary draft means 53 and 55 respectively, the springs 72 and 79 impound a force sufficient to resist compression when the implement backs, or when the implement is being used down hill so that it tends to run forward on the pulling device, and thus draft means 53 and 55 are adapted to serve in tension or compression.

The implement being in the position of Figure 1, the working, or disking, position of Figure 4 may be obtained in three ways: First, being stationary, pin 68 may be withdrawn and the pulling device moved forward which will result in pulling an opposite end of each section forwardly, the other ends of the sections remaining relatively stationary and simultaneously hitch 66 will be caused to swing counterclockwise about pivot 61. When the sections are in the angular position of Figure 4 and hitch 66 has swung to the position of Figure 4, or a similar selected position, the pulling device is then stopped and pin 68 again inserted as shown. The implement may then be moved forward to perform the disking operation; second, being in the position of Figure 1, pin 68 may be withdrawn and the pulling device swung sharply to the right until hitch 66 is in the desired position relative to the pulling device, when it is then stopped and pin 68 again inserted. The pulling device is then swung sharply to the left, which movement will positively move the sections to the angular position of Figure 4; third, being in the position of Figure 1, the pulling device may be swung sharply to the left thus positively moving the sections to the angular position of Figure 4. The pin 68 is then removed and the pulling device is swung sharply to the right until the openings 60 and 64 representing the selected position coincide, and pin 68 is again inserted. It is readily apparent that the hitch 66 and sections 10 and 11 may be adjusted from the positions of Fig. 4 to the positions of Fig. 1 by reversing any one of the three operations heretofore described for adjusting the machine from the position of Fig. 1 to that of Fig. 4, that is to say, the machines may be adjusted from the operating position to the non-operating position by reversing any one of the three operations described for adjusting the machine from the non-operating to the operating position.

Being in the position of Fig. 4, the implement is caused to assume the position of Fig. 5 by simply making a right hand turn. In other words, Fig. 5 illustrates a right hand turn made from the working position of Fig. 4, and when the turn is completed, the sections will again return to the positions of Fig. 4, automatically.

Having thus described the construction and operation of the preferred form of my invention I refer to Fig. 9, which illustrates a modified form of my invention, and includes front and rear sections 85 and 86 respectively which are similar to the sections 10 and 11 of the preferred form and will not therefore be described in detail. Secondary control frame 30 is identical with that of the preferred form and is pivotally connected to each of the sections 85 and 86 in identically the same manner. A primary control frame 87, similar to frame 18 of the preferred form is disposed across the sections 85 and 86 and is slidably associated therewith and with secondary control frame 30 in a manner identical with that of the preferred form. Front rail 88 and rear rail 89 of front section 85 are each provided with a vertical arcuate surface 90 and 91 as indicated. Primary control frame 87 is provided with rollers 92 and 93 journaled thereon in rolling contact one with each of the arcuate surfaces 90 and 91 as shown. Referring now to the rear section, and front and rear rails 94 and 95 respectively, it is seen that front rail 94 is provided with a vertical arcuate surface 96, and that rear rail 95 is provided with a vertical arcuate surface, 97. Primary control frame 87 is provided with rollers 98 and 99 journaled thereon in rolling contact one with each of the arcuate surfaces 96 and 97 as shown. All arcuate surfaces are vertically disposed, and all rollers are mounted on a vertical axis carried by frame 87.

Thus it is seen that sliding movement as between frames 30 and 87 will impart angular movement to the sections 85 and 86 in opposite directions and that swinging movement of either of said sections about its pivotal mounting will impart a similar movement to the other of said sections but in an opposite direction.

The draft and control means of the modified form, of which fragments are shown, are identical with that of the preferred form and the operation is identical, and need not therefore be repeated.

From the foregoing description it will be seen that I have exemplified and described such a device as substantially fulfills the objects of the invention as set forth herein.

I claim:

1. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, and means operably associating said primary control frame and each of said sections separately at points spaced from the pivotal connections of said secondary control frame with said sections, said primary control frame being slidably associated with each of said sections for maintaining said sections in the same plane.

2. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means operably associating said primary control frame and each of said sections separately at points spaced laterally from the pivotal connections of said secondary control frame with said sections, said primary control frame being also slidably associated with each of said sections for maintaining said sections in the same plane, and draft means for said implement.

3. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, said primary control frame being operably associated respectively with each of said sections at points spaced oppositely from the respective pivotal connections of said sections with said secondary control frame, said primary control frame being also slidably associated with each of said sections for maintaining said sections in the same plane, and draft means for said implement.

4. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means operably associating said primary control frame and each of said sections at points spaced from the pivotal connections of said secondary control frame with said sections, said primary control frame being slidably associated with each of said sections, for maintaining said sections in the same plane, separate draft means for each of said control frames, and a pulling device, said separate draft means being mounted on said pulling device at points spaced one from the other.

5. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means operably associating said primary control frame and each of said sections at points spaced laterally from the pivotal connections of said secondary control frame with said sections, said primary control frame being slidably associated with each of said sections, for maintaining said sections in the same plane, a primary draft means for said primary control frame, a secondary draft means for said secondary control frame, a pulling device, means for attaching said primary draft means to said pulling device, and a hitch mounted on said pulling device, said secondary draft means being connected to said hitch at a point spaced from the point of attachment of said primary draft means with said pulling device.

6. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, said primary control frame being slidably associated with each of said sections, for maintaining said sections in the same plane, and operably associated respectively with each of said sections at points spaced oppositely from the respective pivotal connections of said sections with said secondary control frame, a primary draft means for said primary control frame, a secondary draft means for said secondary control frame, a pulling device, means for attaching said primary draft means to said pulling device, and a hitch adjustably mounted on said pulling device, said secondary draft means being connected to said hitch at a point spaced from the point of attachment of said primary draft means with said pulling device.

7. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, said primary control frame being slidably associated with each of said sections, for maintaining said sections in the same plane, and operably associated respectively with each of said sections at points spaced oppositely from the respective pivotal connections of said sections with said secondary control frame, a primary draft means for said primary control frame, a secondary draft means for said secondary control frame, a pulling device, means for attaching said primary draft means to said pulling device, and a hitch adjustably attached to said pulling device and provided with a plurality of connection points spaced from the point of attachment of said primary draft means with said pulling device and by which said secondary shaft means may be selectively connected to said hitch.

8. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame and each of said sections at points spaced from the pivotal connections of said secondary control frame with said sections, said primary control frames being slidably associated with each of said sections, for maintaining said sections in the same plane, and draft means for said implement.

9. A tandem disk earth-working implement comprising, a front section and a rear section, a secondary control frame and a primary control frame, means slidably associating said control frames, one with the other, means pivotally connecting each of said sections intermediate their ends with said secondary control frame at points spaced longitudinally thereof, links pivotally connecting said primary control frame and each of said sections at points spaced laterally from the pivotal connections of said secondary control frame with said sections, said primary control frame being slidably associated with each of said sections, for maintaining said sections in the same plane, and draft means for said control frames.

10. A tandem disk earth-working implement comprising, a front section and a rear section, a secondary control frame and a primary control frame, means slidably associating said control frame one with the other, means pivotally connecting each of said sections intermediate their ends with said secondary control frame at points spaced longitudinally thereof, links pivotally connecting said primary control frame and each of said sections at points spaced oppositely from the respective pivotal connections of said sections with said secondary control frame, said primary control frame being slidably associated with each of said sections, for maintaining said sections in the same plane, and draft means for said control frames.

11. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame and each of said sections at points spaced from the pivotal connections of said secondary control frame with said sections, said primary control frame being slidably associated with each of said sections, for maintaining said sections in the same plane, separate draft means for each of said control frames, and a pulling device, said separate draft means being mounted on said pulling device at points spaced apart one from the other.

12. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame with each of said sections at points spaced laterally from the pivotal connections of said secondary control frame with said sections, said primary control frame being slidably associated with each of said sections for maintaining said sections in the same plane, a primary draft means for said primary control frame, a secondary draft means for said secondary control frame, a pulling device, means for attaching said primary draft means to said pulling device, and a hitch mounted on said pulling device, said secondary draft means being connected to said hitch at a point spaced from the point of attachment of said primary draft means with said pulling device.

13. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame with each of said sections at points spaced laterally and oppositely from the respective pivotal connections of said sections with said secondary control frame, said primary control frame being slidably associated with each of said sections for maintaining said sections in the same plane, a primary draft means for said primary control frame, a secondary draft means for said secondary control frame, a pulling device, means for attaching said primary draft means to said pulling device, and a hitch adjustably mounted on said pulling device so that it may be selectively disposed in any one of a plurality of positions relative to said pulling device, said secondary draft means being connected to said hitch at a point spaced from the point of attachment of said primary draft means with said pulling device.

14. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame with each of said sections at points spaced laterally and oppositely from the respective pivotal connections of said sections with said secondary control frame, said primary control frame being slidably associated with each of said sections for maintaining said sections in the same plane, a primary draft means for said primary control frame, a secondary draft means for said secondary control frame, a pulling device, means for attaching said primary draft means to said pulling device, and a hitch adjustably mounted on said pulling device so that it may be selectively disposed in any one of a plurality of positions relative to said pulling device, said hitch being provided with a plurality of connection points spaced from the point of attachment of said primary draft means with said pulling device and by which said secondary draft means is selectively connected to said hitch.

15. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame with each of said sections at points spaced laterally and oppositely from the respective pivotal connections of said sections with said secondary control frame, said primary control frame being slidably associated with each of said sections for maintaining said sections in the same plane, and a primary and secondary draft means for said control frames, one of said draft means being adapted to vary in length and including resilient means to yieldably resist said variation, a pulling device, means for attaching said primary draft means to said pulling device, and a hitch adjustably mounted on said pulling device so that it may be selectively disposed in any one of a plurality of positions relative to said pulling device, said secondary draft means being connected to said hitch at a point spaced from the point of attachment of said primary draft means with said pulling device.

16. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, links pivotally connecting said primary control frame with each of said sections at points spaced laterally and oppositely from the respective pivotal connections of said sections with said secondary control frame, said primary control frame being slidably associated with each of said sections for maintaining said sections in the same plane, and a primary and secondary draft means for said control frames, each of said draft means being adapted to vary in length and including resilient means to yieldably resist said variation, a pulling device, means for attaching said primary draft means to said pulling device, and a hitch adjustably mounted on said pulling device so that it may be selectively disposed in any one of a plurality of positions relative to said pulling device, said hitch being provided with a plurality of connection points spaced from the point of attachment of said primary draft means with said pulling device and by which said secondary draft means is selectively connected to said hitch.

17. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means operably associating said primary control frame with the front and rear sides of said front section at points spaced in a lateral direction from the pivotal connections of said secondary control frame with said front section, means operably associating said primary control frame with the front and rear sides of said rear section at points spaced laterally from the pivotal connection of said secondary control frame with said rear section and in a direction opposite to said first mentioned lateral direction, said primary control frame being slidably associated with each of said sections for maintaining said sections in the same plane, and draft means for said implement.

18. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means including rollers operably associating said primary control frame with each of said sections at points spaced laterally from the pivotal connections of said secondary control frame with said sections, said primary control frame being slidably associated with each of said sections for maintaining said sections in the same plane, and draft means for said implement.

19. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, arcuate means carried by each of said sections and means including rollers carried by said primary control frame in rolling contact with said arcuate means for operably associating said primary control frame with said sections, said primary control frame being slidably associated with each of said sections for maintaining said sections in the same plane, and draft means for said implement.

20. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, means operably associating said primary control frame with the front and rear sides of said front section at points spaced in a lateral direction from the pivotal connection of said secondary control frame with said front section, means operably associating said primary control frame with the front and rear sides of said rear section at points spaced laterally from the pivotal connection of said secondary control frame with said rear section and in a direction opposite to said first mentioned lateral direction, said primary control frame being slidably associated with each of said sections for maintaining said sections in the same plane, separate draft means for each of said control frames, and a pulling device, said separate draft means being mounted on said pulling device at points spaced one from the other.

21. A tandem disk earth-working implement including, a front section and a rear section, a secondary control frame and a primary control frame, means slidably associating said control frames one with the other, means pivotally connecting each of said sections at points intermediate their ends with said secondary control frame at points spaced longitudinally thereof, means including rollers operably associating said primary control frame with each of said sections at points spaced laterally from the pivotal connections of said secondary control frame with said sections, said primary control frame being slidably associated with each of said sections for maintaining said sections in the same plane, a primary draft means for said primary control frame, a secondary draft means for said secondary control frame, a pulling device, means for attaching said primary draft means to said pulling device, and a hitch mounted on said pulling device, said secondary draft means being connected to said hitch at a point spaced from the point of attachment of said primary draft means with said pulling device.

22. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, arcuate surfaces carried by each of said sections and rollers carried by said primary control frame in rolling contact with said arcuate surfaces for operably associating said primary control frame with said sections, said primary control frame being slidably associated with each of said sections for maintaining said sections in the same plane, a primary draft means for said primary control frame, a secondary draft means for said secondary control frame, a pulling device, means for attaching said primary control frame to said pulling device, and a hitch adjustably mounted on said pulling device so that it may be selectively disposed in any one of a plurality of positions relative to said pulling device, said secondary draft means being connected to said ditch at a point spaced from the point of attachment of said primary draft means with said pulling device.

23. A tandem disk earth-working implement comprising, a front section and a rear section, a secondary control frame and a primary control frame, means slidably associating said control frames one with the other, means pivotally connecting each of said sections intermediate their ends with said secondary control frame at points spaced longitudinally thereof, arcuate surfaces carried by each of said sections, and rollers carried by said primary control frame in rolling contact with said arcuate surfaces for operably associating said primary control frame with each of said sections, said primary control frame being slidably associated with each of said sections for maintaining said sections in the same plane, a primary draft means for said primary control frame, a secondary draft means for said secondary control frame, a pulling device, means for attaching said primary control frame to said pulling device, and a hitch adjustably mounted on said pulling device so that it may be selectively disposed in any one of a plurality of positions relative to said pulling device, said hitch being provided with a plurality of connection points spaced from the point of attachment of said primary draft means with said pulling device and by which said secondary draft means is connected to said hitch.

24. A tandem disk earth-working implement comprising, a front section and a rear section, a secondary control frame and a primary control frame, means slidably associating said control frames one with the other, means pivotally connecting each of said sections intermediate their ends to said secondary control frame at points spaced longitudinally thereof, arcuate surfaces carried by each of said sections, and rollers carried by said primary control frame in rolling contact with said arcuate surfaces for operably associating said primary control frame with each of said sections, said primary control frame being slidably associated with each of said sections for maintaining said sections in the same plane, a primary draft means for said primary control frame, a secondary draft means for said secondary control frame, said draft means being adapted to vary in length and including resilient means to yieldably resist said variation, a pulling device, means for attaching said primary control frame to said pulling device, and a hitch adjustably mounted on said pulling device so that it may be selectively disposed in any one of a plurality of positions relative to said pulling device, said hitch being provided with a plurality of connection points spaced from the point of attachment of said primary draft means with said pulling device and by which said secondary draft means may be connected to said hitch.

25. A tandem disk earth-working implement comprising, a front section and a rear section, a rigidly constructed primary control frame and a rigidly constructed secondary control frame, means slidably associating said control frames one with the other and means operably associating each of said control frames with each of said sections so that lateral turning movement of either of said sections in a given direction will impart a similar turning movement to the other of said sections in the opposite direction, one of said control frames being slidably confined with each of said sections so as to maintain said sections in the same plane, and draft means for the implement.

26. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, at least one of said control frames being associated with said sections so as to maintain said sections in the same plane.

27. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, at least one of said control frames being slidably associated with said sections so as to maintain said sections in the same plane, separate draft means for each of said control frames for pulling said sections across the ground and for imparting relative sliding movement to said control frames, and a pulling device, said separate draft means being operably connected with said pulling device at spaced points of attachment so that as said pulling device changes direction of travel said draft means will be actuated to cause relative sliding movement of said control frames and thus positively adjust the angular relationship of said sections.

28. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, at least one of said control frames being slidably associated with said sections so as to maintain said sections in the same plane, a primary draft means for said primary control frame and a secondary draft means for said secondary control frame, said primary and secondary draft means being connected with said control frames for pulling said sections across the ground and adapted to be actuated to cause relative sliding movement to said control frames, a pulling device, means for articulately connecting said primary draft means to said pulling device, and a hitch mounted on said pulling device, said secondary draft means being articulately connected to said hitch at a point laterally removed from the point of connection of said primary draft means with said pulling device so that as said pulling device changes direction of travel said draft means will be actuated to cause relative sliding movement of said control frames and thus positively adjust the angular relationship of said sections.

29. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, one of said control frames being slidably associated with each of said sections so as to maintain said sections in the same plane, a primary draft means for said primary control frame and a secondary draft means for said secondary control frame, said primary and secondary draft means being connected with said control frames for pulling said sections across the ground and adapted to be actuated to cause relative sliding movement of said control frames, a pulling device, means for articulately connecting said primary draft means to said pulling device, and a hitch adjustably mounted on said pulling device, said secondary draft means being articulately connected to said hitch at a point laterally removed from the point of connection of said primary draft means with said pulling device so that as said pulling device changes direction of travel said draft means will be actuated to cause relative sliding movement of said control frames and thus positively adjust the angular relationship of said sections.

30. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, one of said control frames being slidably associated with each of said sections so as to maintain said sections in the same plane, a primary draft means for said primary control frame and a secondary draft means for said secondary control frame, said primary and secondary draft means being connected with said control frames for pulling said sections across the ground and adapted to be actuated to cause relative sliding movement of said control frames, a pulling device, means for articulately connecting said primary draft means to said pulling device, and a hitch mounted on said pulling device, said secondary draft means being adjustably connected to said hitch at a point laterally removed from the point of connection of said primary draft means with said pulling device so that as said pulling device changes direction of travel said draft means will be actuated to cause relative sliding movement of said control frames and thus positively adjust the angular relationship of said sections.

31. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, one of said control frames being slidably confined with each of said sections so as to maintain said sections in the same plane, a primary draft means for said primary control frame and a secondary draft means for said secondary control frame, said primary and secondary draft means being connected with said control frames for pulling said sections across the ground and adapted to be actuated to cause relative sliding movement of said control frames, a pulling device, means for articulately connecting said primary draft means to said pulling device, and a hitch mounted on said pulling device, said secondary draft means being adjustable to determine its length and articulately connected to said hitch at a point laterally removed from the point of connection of said primary draft means with said pulling device so that as said pulling device changes direction of travel said draft means will be actuated to cause relative sliding movement of said control frames and thus positively adjust the angular relationship of said sections.

32. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, one of said control frames being slidably confined with each of said sections so as to maintain said sections in the same plane, a primary draft means for said primary control frame and a secondary draft means for said secondary control frame, said primary and secondary draft means being connected with said control frames for pulling said sections across the ground and adapted to be actuated to cause relative sliding movement of said frames, a pulling device, means for articulately connecting said primary draft means to said pulling device, and a hitch adjustably mounted on said pulling device, said secondary draft means being adjustable to determine its length and adjustably connected to said hitch at a point laterally removed from the point of connection of said primary draft means with said pulling device so that as said pulling device changes direction of travel said draft means will be actuated to cause relative sliding movement of said control frames and thus positively adjust the angular relationship of said sections.

33. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, said lateral turning movement of said sections being limited and at least one of said control frames being slidably confined with each of said sections for maintaining said sections in the same plane, separate draft means for each of said control frames for pulling said sections across the ground and for imparting relative sliding movement to said control frames, and a pulling device, said separate draft means being operably connected with said pulling device at spaced points of attachment so that as said pulling device turns to a new direction of travel said draft means will be actuated to cause relative sliding movement of said control frames and thus positively adjust the angular relationship of said sections, at least one of said draft means being adapted to vary in effective length so that said pulling device may execute turning movements exceeding the limits of section movement.

34. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, said lateral turning movement of said sections being limited, and at least one of said control frames being slidably confined with each of said sections for maintaining said sections in the same plane, separate draft means for each of said control frames for pulling said sections across the ground and for imparting relative sliding movement to said control frames, and a pulling device, said separate draft means being operably connected with said pulling device at spaced points of attachment so that as said pulling device turns to a new direction of travel said draft means will be actuated to cause relative sliding movement of said control frames and thus positively adjust the angular relationship of said sections, at least one of said draft means being adapted to vary in effective length so that said pulling device may execute turning movements exceeding the limits of section movement and including resilient means to yieldably resist said variation so as to prevent the implement from over-running said pulling device when operating down hill.

35. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, said lateral turning movement of said sections being limited and one of said control frames being slidably confined with each of said sections for maintaining said sections in the same plane, separate draft means for each of said control frames for pulling said sections across the ground and for imparting relative sliding movement to said control frames, and a pulling device, said separate draft means being operably connected with said pulling device at spaced points of attachment so that as said pulling device turns to a new direction of travel said draft means will be actuated to cause relative sliding movement of said control frames and thus positively adjust the angular relationship of said sections, each of said separate draft means being adapted to vary in effective length so that said pulling device may execute turning movements exceeding the limits of section movement.

36. A tandem disk earth-working implement comprising, a front section and a rear section, a primary control frame and a secondary control frame, means slidably associating said control frames one with the other and means operably associating each of said control frames with each of said sections so that relative sliding movement of said control frames will impart opposite lateral turning movement to said sections, said lateral turning movement of said sections being limited, one of said control frames being slidably confined with each of said sections for maintaining said sections in the same plane, separate draft means for each of said control frames for pulling said sections across the ground and for imparting relative sliding movement to said control frames, and a pulling device, said separate draft means being operably connected with said pulling device at spaced points of attachment so that as said pulling device turns to a new direction of travel said draft means will be actuated to cause relative sliding movement of said control frames and thus positively adjust the angular relationship of said sections, each of said separate draft means being adapted to vary in effective length so that said pulling device may execute turning movements exceeding the limits of section movement and each including resilient means to yieldably resist said variation so as to prevent the implement from over-running said pulling device when operating downhill.

CHARLES LE BLEU.